Figure 1:
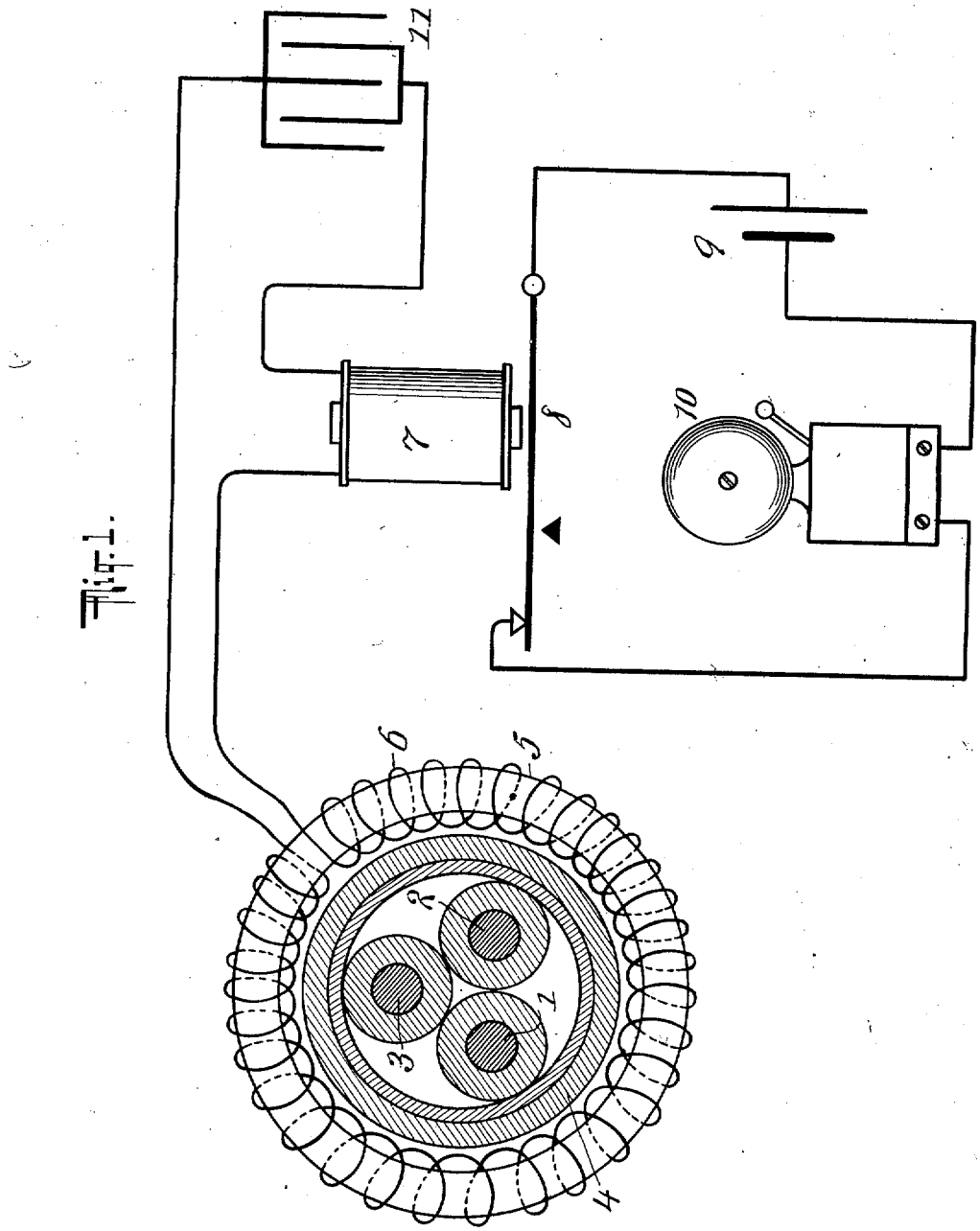

No. 857,262.

PATENTED JUNE 18, 1907.

P. TORCHIO & T. W. VARLEY.
GROUND AND FAULT DETECTOR FOR ELECTRIC DISTRIBUTION SYSTEMS.
APPLICATION FILED MAR. 8, 1907.

4 SHEETS—SHEET 1.

WITNESSES:
Gustave Dieterich
Edwin F. Dietrich

INVENTORS
Philip Torchio
Thomas W. Varley
BY Park Benjamin
their ATTORNEY

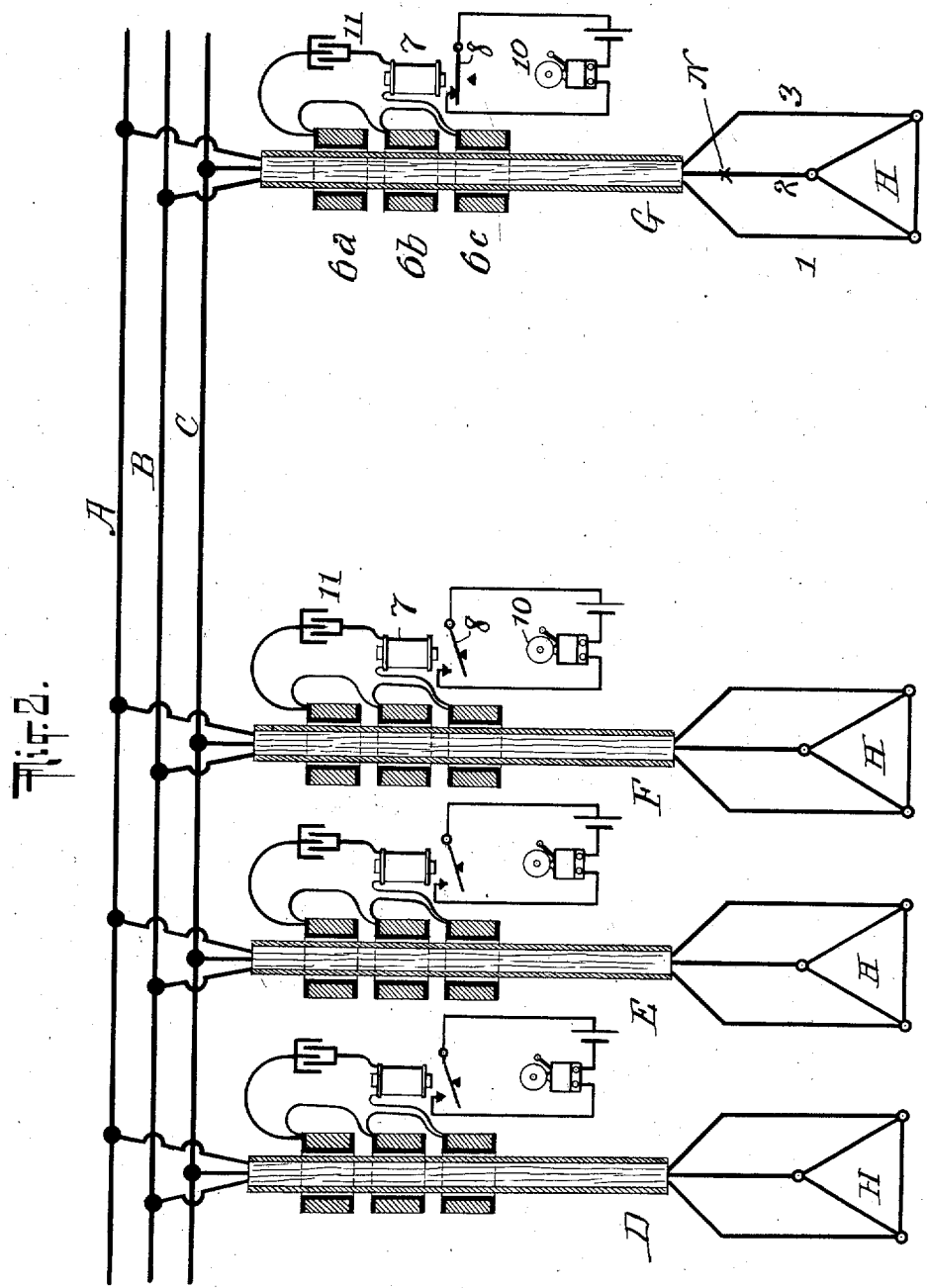

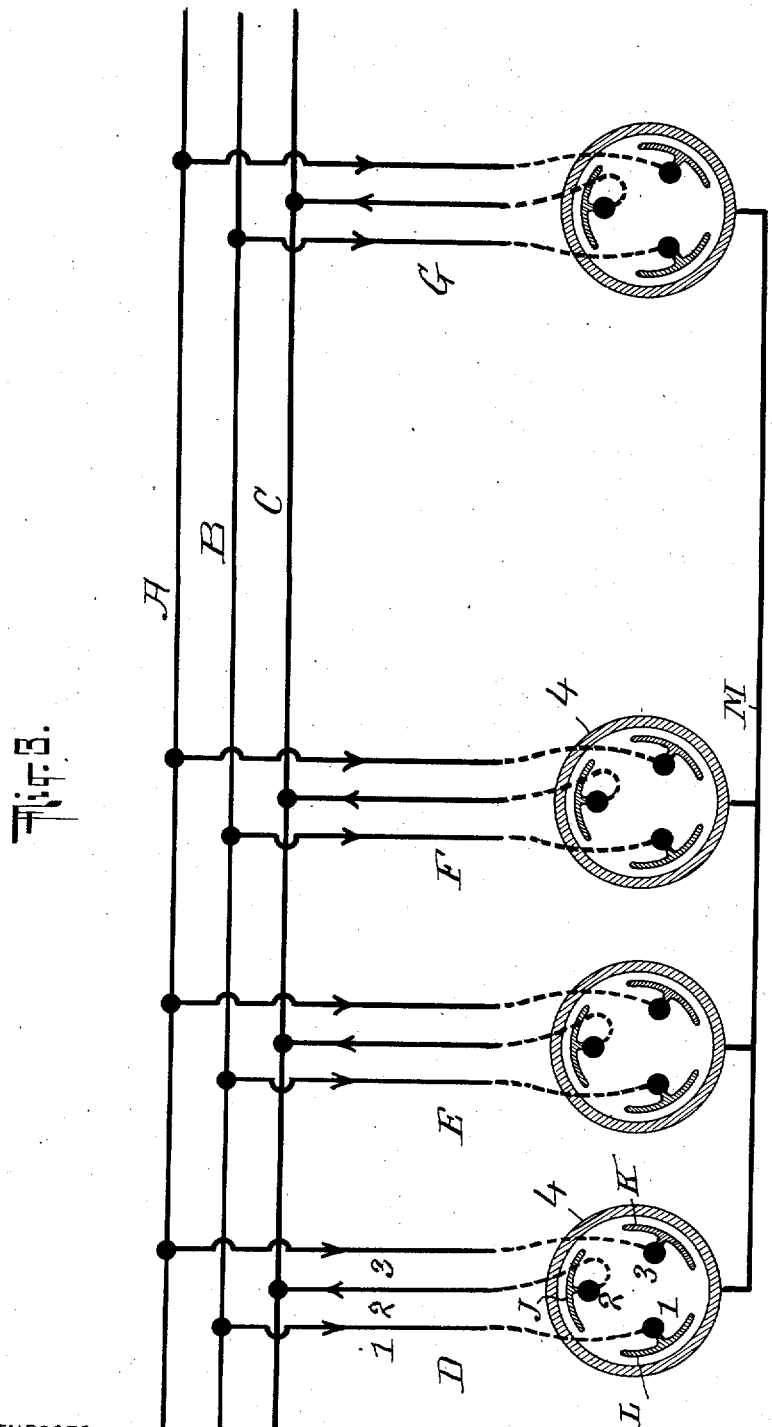

No. 857,262. PATENTED JUNE 18, 1907.
P. TORCHIO & T. W. VARLEY.
GROUND AND FAULT DETECTOR FOR ELECTRIC DISTRIBUTION SYSTEMS.
APPLICATION FILED MAR. 8, 1907.
4 SHEETS—SHEET 4.
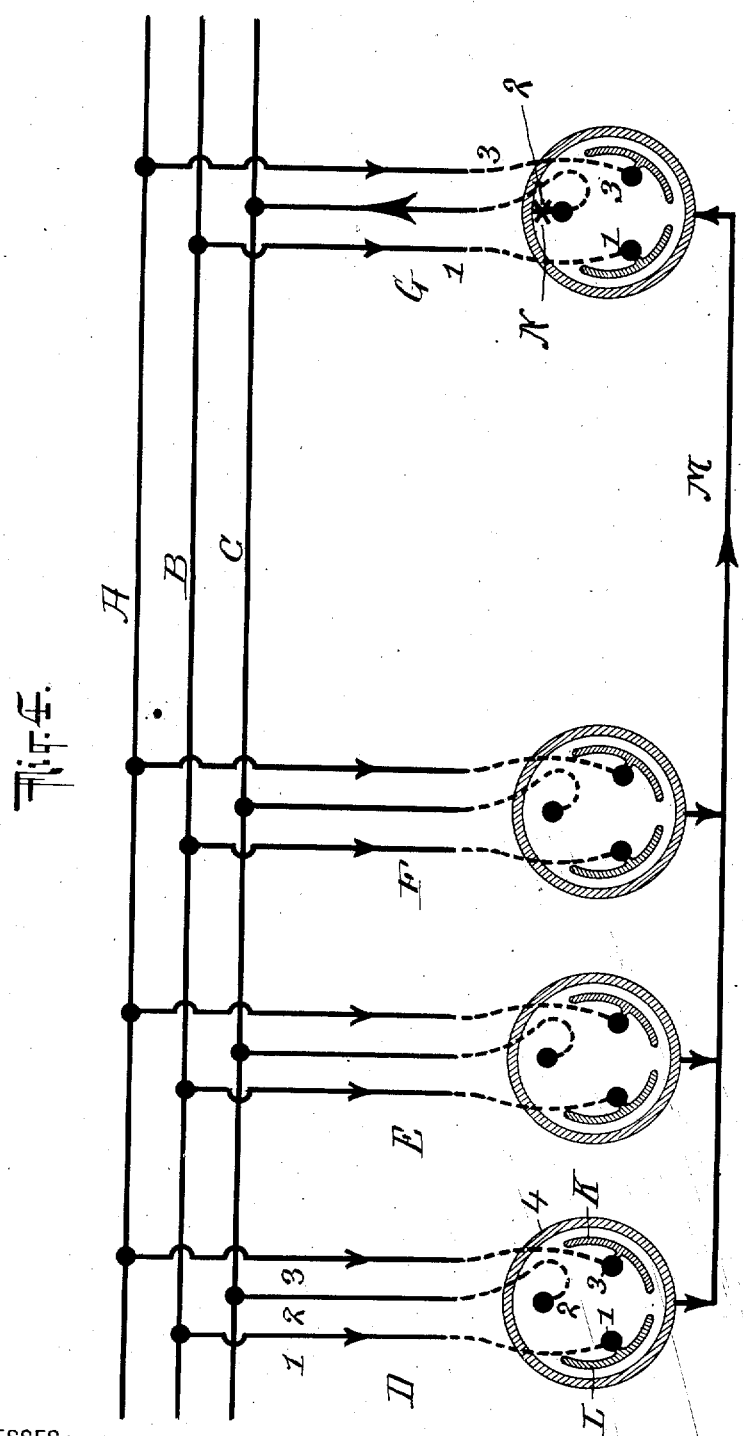
WITNESSES:
Gustave Dieterich
Edwin H. Dietrich
INVENTORS
Philip Torchio
Thomas W. Varley
BY
ATTORNEY

UNITED STATES PATENT OFFICE.

PHILIP TORCHIO AND THOMAS W. VARLEY, OF NEW YORK, N. Y.

GROUND AND FAULT DETECTOR FOR ELECTRIC DISTRIBUTION SYSTEMS.

No. 857,262.  Specification of Letters Patent.  Patented June 18, 1907.

Application filed March 8, 1907. Serial No. 381,201.

*To all whom it may concern:*

Be it known that we, PHILIP TORCHIO and THOMAS W. VARLEY, the said TORCHIO being a subject of the King of Italy and the said VARLEY being a citizen of the United States, both residing at New York, in the county of New York and State of New York, have invented a certain new and useful Improvement in Ground and Fault Detectors for Electric Distribution Systems, of which the following is a specification.

The invention relates to the detection and location of faults, grounds, etc. in a distribution system for alternating current.

The invention consists in the combination with a main line and feeders therefrom of devices as hereinafter set forth, whereby upon the establishment of a ground in or other disturbance of the capacity balance of any one feeder, the balanced capacities of all the other feeders will be disturbed and the sum of said disturbances thrown upon said grounded feeder, thus causing an indicating device associated with said last named feeder to be set in operation.

The invention further consists in the various combinations set forth in the claims.

In the accompanying drawings all of which are electrical diagrams, Figure 1 shows the arrangement of the ring transformer associated with the feeder, and the indicating device controlled by said transformer. Fig. 2 is a general view showing the various parts of my device and circuit connections in a three wire system. Fig. 3 indicates conditions in our apparatus prior to the establishment of a ground at one feeder, and Fig. 4 illustrates conditions after said establishment.

Similar numbers and letters of reference indicate like parts.

We will first describe the device for indicating the presence of an unbalanced alternating current upon a feeder composed of a plurality of conductors.

In Figs. 1, 2 and 3, are the three conductors of a feeder cable insulated as usual from one another and inclosed in a lead sheath 4. These three conductors may all be connected to the mains or bus. Surrounding the cable is the iron ring core 5 of a transformer, the coil 6 of which is in circuit with the electro magnet 7. The pivoted armature 8 of the magnet is in relay circuit with any source of current 9 and an indicating or alarm device such as the bell 10, so that a current energizing the electromagnet will attract the armature and hence sound the bell. Preferably there may be placed in the transformer circuit a condenser 11, the function of which is to neutralize the self induction of the transformer and relay magnet. The condenser is to be so balanced as to be most effective at the normal frequency of the system and the different turns of the transformer and relay magnet are to be so selected as, in conjunction with the condenser, to enable the minimum amount of energy to be used.

So long as the algebraic sum of the currents on the three conductors 1, 2, 3, remains at zero, the device does not operate. But when that algebraic sum ceases to be zero, or in other words, when from any cause the balance existing between the currents on said conductors is disturbed, then energy, being the resultant of the current in said conductors, is transmitted magnetically to the iron of the transformer and being collected by the coil windings is transmitted to the relay magnet, and the alarm is sounded. When the conductors carry comparatively heavy currents, this unbalanced condition may, for example, be due to the relative change in their position along the cable with respect to the transformer core.

The relay can be easily tested by transmitting a current of normal frequency and of amount sufficient to energize the relay directly through the lead sheath from bus to ground.

While a transformer having a single ring core and winding connected with a relay alarm and condenser may be used, we find it preferable in practice to make the transformer in a plurality of sections as illustrated in Fig. 2. Here the main or bus has three conductors A, B, C, from which extend the feeders D, E, F, G, each to its own load indicated by the triangles at H. Upon each feeder are the three transformer sections $6^a$, $6^b$ and $6^c$, connected in series with the relay magnet 7 and condenser 11, as already described. The advantage of this arrangement is that any normal non-uniformity of inductive effect of the conductors upon the transformer due to their usual twist when in a cable and consequent constant change in position, is smoothed out, first, by the lead sheath, and second, by placing the transformer sections outside of that sheath and separating them at suitable distances apart along the cable.

We will now describe the application of the invention to the detection of a ground on any feeder of an alternating current electric lighting system. As is well known, the occurrence of such an accident, when heavy currents are used may be productive of great loss of current and even of disastrous results. Hitherto such detection has been difficult and has required direct examination of the several feeders. This is wholly avoided by our invention, which by indicating instantly at the central station the particular feeder which has become impaired allows of immediate cutting of that feeder out of the active system. In order to explain this clearly it is necessary to recur to the diagrams Figs. 3 and 4, which respectively illustrate the normal current condition on the system, and the unbalanced condition when a ground occurs on some one feeder. For the sake of clearness, the transformers and associated magnets and condensers are omitted from these figures.

In Fig. 3, A, B, C as before represents the main or bus, and D, E, F, G, the feeders therefrom. The circles 4 are the lead feeder sheaths. When the feeder conductors convey alternating current there is, as is well known, a condenser action from each conductor 1, 2, 3 of the cable, to the lead sheath 4, (which is grounded) across the intervening dielectric. So also there is condenser action between the conductors themselves through the intervening dielectric, but for present purposes this need not be considered. To illustrate symbolically this condenser action between the conductors and the cable sheath, we have shown each conductor as connected to an imaginary condenser plate J, K, L, so that in each instance the condenser action referred to may be conveniently conceived as taking place between the sheath 4 and the three condenser plates J, K, L, across the dielectric between said sheath and plates. The several sheaths being all grounded may be regarded as connected by the conductor M. Now considering the flow of charging currents in one feeder as D, the arrows indicate that flow when one conductor 2 of that feeder is at its maximum in the negative direction. The currents in each of the other conductors 1, 3, will each be one half, in the positive direction. The algebraic sum of all the currents in the feeder will then be zero, and that will be equally true of all the other feeders. Consequently every feeder will be in balance, and if as already explained the device of Fig. 1 should be applied to any feeder, it would not be operated.

Turning now to Fig. 4, let it be supposed that a ground occurs at the conductor 2 of feeder G, indicated at N, the current in this conductor as before being maximum, and the currents in 1, 3, each being one half. The condenser action between the grounded conductor and its sheath will disappear. This is indicated by the removal of the imaginary condenser plate J. Considering for the moment this feeder only, to the exclusion of the others, manifestly this grounding of its conductor 2 cannot create an unbalancing of the currents in that feeder. But the grounding of conductor 2 of feeder G brings every other corresponding conductor in the other feeders, to the same potential, all being connected to main conductor, and hence in every other feeder the condenser action between conductor 2 and sheath 4 disappears. The consequence is that in every other feeder D, E, F, the current balance is disturbed, practically in proportion to their respective mileages, provided all the feeders are electrically and mechanically alike. Then the sum of all their disturbances is thrown on feeder G, and hence that feeder is unbalanced and becomes capable of actuating the indicating device of Fig. 1, if applied thereto. The arrows in Fig. 4 show the resulting current directions, there being, as is evident, no current on the conductors 2 of feeders D, E, F, and a heavy current on conductor 2 of feeder G.

Returning now to Fig. 2, and assuming as in Fig. 4, the ground on conductor 2 of feeder G. The sum of the unbalanced currents from feeders D, E, F, will disturb the balance of feeder G. The transformer on feeder G will then actuate the indicating device of that feeder, and thus it will be shown that the ground is on feeder G, and not on feeders D, E, F. In like manner if a conductor in any other feeder be grounded, the indicating device associated with that feeder only will be operated. It remains only to place the several indicating devices at some central station, to receive there instant notice of the grounding of any feeder of the system, when such feeder may be at once cut out until proper repair is made.

It is to be understood that in constructing the device each magnet 7 in each feeder is to be adjusted to a point beyond the capacity of that feeder to operate, or in other words, so that the unbalanced capacity of any one feeder cannot cause its magnet to close the relay circuit and so sound the alarm. Hence, although in Fig. 1 there is lack of balance in feeders D, E, F, the armatures 8 are not attracted, but when the sum of the unbalanced currents of the three feeders D, E, F, disturbs the balance of feeder G, then the unbalanced capacity of that feeder is sufficient to operate its associated magnet, as already described. Thus to illustrate; if the unbalanced capacity of each feeder D, E, F, G, be represented by say 10, and the associated magnet be adjusted not to operate except under a disturbance of balance represented by 11, then it is clear that a disturbance of 10 in any one feeder cannot operate its associated magnet. But if the sum of the disturbances on D, E, F, represented by 30 be concentrated upon feeder G, then obviously the disturbance acting on its associated magnet is greatly in excess of 11, and hence the alarm will be sounded, indicating the ground on feeder G.

We claim:—

1. In a device for indicating capacity disturbance on a main line and feeder system, a plurality of feeders of normally balanced capacity and means for selecting the particular feeder, the fault on which has caused said capacity disturbance.

2. In a device for indicating capacity disturbance on a main line and feeder system, a plurality of feeders of normally balanced capacity and means associated with each of said feeders for selecting the particular feeder, the fault on which has caused said capacity disturbance.

3. In a device for indicating capacity disturbance on a main line and feeder system, a plurality of feeders of normally balanced capacity and inductively controlled means for selecting the particular feeder, the fault on which has caused said capacity disturbance.

4. A main line, a plurality of feeders of normally balanced capacity, a coil surrounding each feeder and means associated with each coil for indicating current induced in said coil due to variations in capacity balance in said feeder.

5. A main line, a plurality of feeders of normally balanced capacity, and means actuated by a disturbance of capacity balance in one feeder for throwing thereon the sum of the resulting capacity disturbances of the other feeders.

6. A main line, a plurality of feeders of normally balanced capacity, an indicating device associated with each feeder, and means actuated by an unbalanced capacity in one feeder for causing the indicating device associated therewith to be operated by the sum of the resulting unbalanced capacities of the other feeders.

7. A main line, a plurality of feeders of normally balanced capacity, an indicating device associated with each feeder and constructed to be inductively operated thereby at a certain predetermined disturbance in said balance, and means actuated by a balance disturbance in any one feeder for throwing upon said feeder, the sum of the disturbances in the other feeders.

8. A main line, a plurality of feeders of normally balanced capacity, a ring transformer surrounding each feeder and means associated with each transformer for indicating current induced in the coil thereof due to variations in capacity balance of said feeder.

9. A multiple conductor of normally balanced capacity, a ring transformer surrounding said conductor and a translating device in circuit with said transformer and constructed to be operated by the induced current due to disturbance of said balance.

10. A multiple conductor of normally balanced capacity, a ring transformer surrounding said conductor, and an alarm device in circuit with said transformer and constructed to be operated by the induced current due to disturbance of said balance.

11. A multiple conductor of normally balanced capacity, a ring transformer surrounding said conductor, an electro magnet in circuit with said transformer and, in relay circuit controlled by said magnet, and indicating device.

12. A multiple conductor of normally balanced capacity, a ring transformer surrounding said conductor, an electro magnet and a condenser in circuit with said transformer, and in relay circuit controlled by said magnet, and indicating device.

13. A multiple conductor of normally balanced capacity, a plurality of ring transformers surrounding said conductor, and an alarm device constructed to be operated by the induced current due to disturbances of said balance: the said transformers and alarm device being in series circuit.

In testimony whereof we have affixed our signatures in presence of two witnesses.

PHILIP TORCHIO.
THOMAS W. VARLEY.

Witnesses:
ARTHUR R. STORM,
HARRY E. LANE.